May 29, 1956     A. V. JONASSON     2,747,275

PIPE CUTTER

Filed July 29, 1955

INVENTOR.
Axel V. Jonasson
BY Ralph Hammar
Attorney

United States Patent Office 2,747,275
Patented May 29, 1956

2,747,275
PIPE CUTTER

Axel V. Jonasson, Erie, Pa., assignor to Reed Manufacturing Company, Erie, Pa., a corporation of Pennsylvania Application July 29, 1955, Serial No. 525,129

3 Claims. (Cl. 30—101)

This invention relates to rigid frame pipe cutters where fixed cutting wheels are journaled in the frame and engage one side of the pipe and adjustable wheels are journaled on guide members carried by the frame and engage the opposite side of the pipe under pressure selected by pressure screws cooperating with the guide members. In such cutters, the rigidity of the frame holds the wheels aligned in a common plane in all adjusted positions which is essential if the cutting wheels are to track.

This invention is intended to retain the positive wheel alignment of the rigid frame pipe cutter and to add spring mounting between the frame and the pressure screw which will yield to limit the wheel pressure when the wheels encounter surface irregularities such as raised lettering or seams on cast iron pipe. The mounting can be set up solid so the yielding feature can be eliminated when the pipe cutter is used on smooth surfaced pipe.

Figure 1:
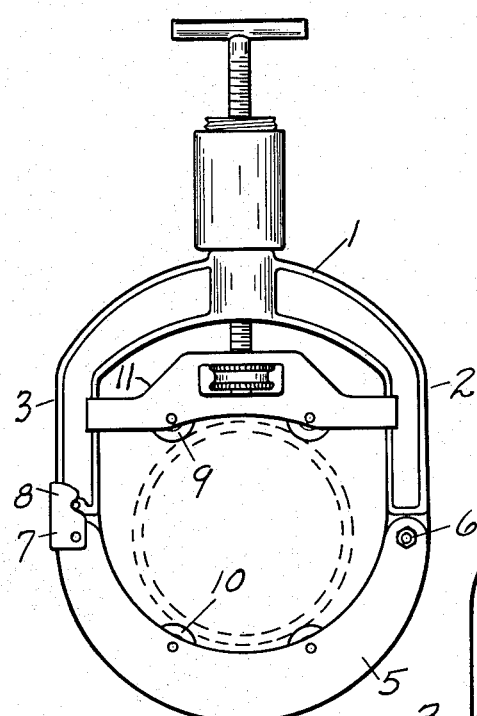
Figure 2:
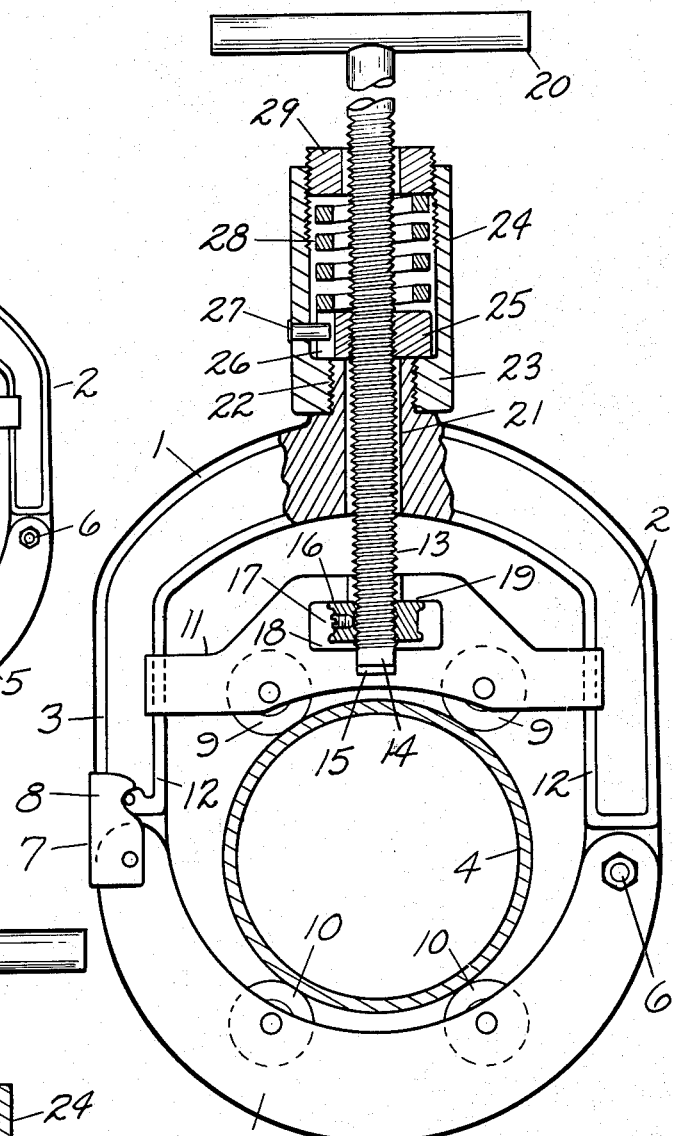
Figure 3:
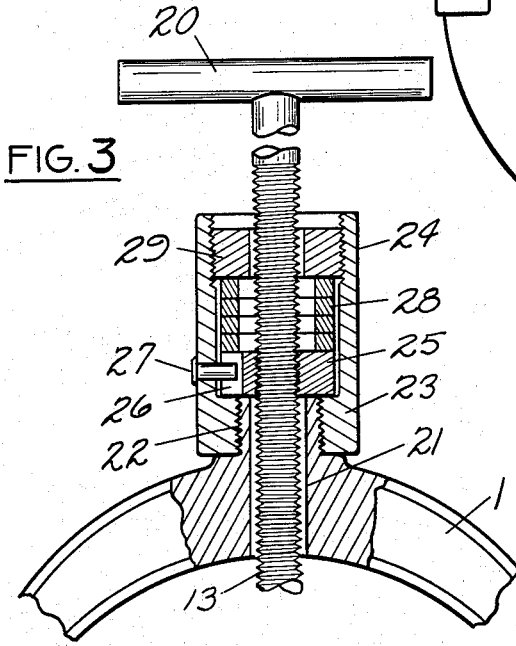

In the drawing, Fig. 1 is a side elevation of a pipe cutter; Fig. 2 is an enlarged section through the spring mounting between the pressure screw and frame and Fig. 3 is a section similar to Fig. 2 with the mounting set up solid to eliminate the yielding feature.

The invention is shown applied to the rigid frame pipe cutter disclosed in greater detail in application Serial No. 327,105. The rigid frame comprises an upper U shaped section 1 with depending arms 2 and 3 straddling the pipe 4 and a lower semicircular section 5 hinged at 6 to the arm 2 and having the other end secured to the arm 3 by a catch 7 of channel section with flanges 8 straddling adjacent portions of the frame members 1 and 5. When the frame members are latched together, the frame is rigid. This is important because it holds the upper and lower cutting wheels 9 and 10 aligned in a common plane. If these wheels were not in a common plane, the wheels would not track and could not make a single cut. The upper wheels 9 are journaled in a cross-head 11 slidable on guides 12 on the inner surface of the arms 2 and 3. The guides 12 being widely spaced apart on opposite sides of the pipe hold the upper wheels 9 in a common plane. The lower wheels 10, which are journaled in the rigid lower frame section 5, are likewise rigidly held in the same common plane.

In the use of the pipe cutter, the pipe 4 is placed between the wheels 9 and 10 and the cutting pressure is developed by a pressure screw 13 having its smooth end 14 received in a socket 15 in the cross-head. The pressure is transmitted from the pressure screw to the cross-head by a nut 16 threaded on the pressure screw and locked in adjusted position by a set screw 17. The nut 16 engages surfaces 18 on the cross-head when the wheels 9 are to be pressed against the pipe and engages surfaces 19 on the cross-head when the wheels 9 are to be moved away from the pipe. The outer end of the pressure screw has a handle 20. The parts so far described are typical of rigid frame pipe cutters and may vary substantially in appearance from the particular rigid frame construction illustrated. The alignment of the cutting wheels is not dependent upon the pressure screw because there is only a floating connection between the pressure screw and the cross-head 11. The alignment of the cutting wheels is obtained from the rigidity of the frame and of the cross-head or guide member 11 forming part of that frame.

In the cutting of pipe having marked surface irregularities such as cast iron pipe where there may be raised names cast into the pipe and longitudinal seams projecting outside the diameter of the pipe, it is desirable that yielding of the wheels 9 be permitted so as to prevent excessive build-up in pressure when the wheels encounter such irregularities. At the same time it is desirable that this yielding movement be obtained without changing the positive alignment inherent in rigid frame type pipe cutters and without changing the manner in which the pipe cutter is used. That is, the user still can operate a single pressure screw and, in all other respects, can use the pipe cutter as though the yielding feature were not present.

Instead of being screwed directly into the upper frame section, the pressure screw 13 extends out through an enlarged bore 21 at the center of the top frame section. The pressure screw, accordingly, is free to slide relative to the frame. On the outside of the top frame section, there is an externally threaded projection 22 on which is screwed the bottom wall 23 of a cylindrical housing 24. Within the housing 24 is a nut 25 on the pressure screw 13 and having a key-way 26 cooperating with a pin 27 to prevent rotation of the nut relative to the housing. The nut acts as a spring seat for a coil spring 28 compressed between the nut 25 and an upper spring seat 29 threaded into the upper end of the housing 24. The amount of pressure in the spring 28 can be adjusted by turning the spring seat 29 and by turning the spring seat sufficiently, the coil spring 28 can be completely compressed so that it will serve as a solid connection. By the construction just described, the nut 25 is slidably but non-rotatably supported in the housing 24 and can yield away from the bottom wall 23 of the housing whenever the pressure exerted on the upper wheel 9 exceeds the pressure of the coil spring 28. This provides a pressure transmitting connection from the frame 1 to the pressure screw 13 which limits the pressure which can be transmitted to the pressure screw to the force exerted by the coil spring 28. The pressure transmitting connection between the frame 1 and the pressure screw does not affect the alignment of the cutting wheels 9 and 10. The pressure screw has a floating connection between it and the cross-head 11 so that the alignment depends only upon the construction of the rigid frame and not upon the parts associated with the yielding pressure spring 28.

In the use of the cutter, the maximum pressure which can be developed on the wheels is preset by turning the spring seat 21 relative to the housing 24, or if the pressure limiting feature is to be entirely eliminated, the spring seat is turned sufficiently to compress the spring 28 solid. After this initial adjustment, the cutter is used like any ordinary cutter. The pipe is placed between the wheels and the pressure screw 13 is turned by the handle 20 to bring the wheels 9 and 10 to cutting engagement with the pipe. The cut is made either by rotating the cutter completely about the pipe or by oscillating the cutter through an arc of sufficient length so that the entire circumference of the pipe is traversed by the wheels. As the wheels are embedded in the surface of the pipe, the handle 20 of the pressure screw is turned to maintain the cutting pressure. While the spring 28 is effective, the maximum pressure on the cutting wheels which may vary from a few hundred pounds up to a thousand or more pounds per wheel is limited by the tension in the spring 28. This is particularly advantageous in cutting brittle cast iron pipe where the cutting action is more like glass cutting in that the outer surface is merely scored or scratched.

What is claimed as new is:

1. A pipe cutter comprising wheels journaled in a common plane for engaging opposite sides of a pipe, a rigid frame including a guide member on one side of the pipe and guided on the frame for movement in said plane, wheel journals respectively in the guide member on one side of the pipe and in the rigid frame on the opposite side of the pipe, a pressure screw axially slidable through the rigid frame and extending transverse to and into pressure transmitting relation with the guide member, a spring housing fixed to the rigid frame, a coil spring in the housing surrounding the pressure screw, a first spring seat supported in the housing for the end of the spring remote from the guide member, said spring seat having an opening therein through which the pressure screw slidably extends, and a second spring seat for the other end of the spring including a nut threaded on the pressure screw and slidable but non-rotatable relative to the housing.

2. A pipe cutter comprising wheels journaled in a common plane for engaging opposite sides of a pipe, a rigid frame including a guide member within the frame on one side of the pipe and guided on the frame for movement in said plane, wheel journals respectively in the guide member on one side of the pipe and in the rigid frame on the opposite side of the pipe, a pressure screw extending slidably through the rigid frame transverse to the guide member, said screw having its inner end in pressure transmitting relation with the guide member and its outer end accessible for turning, a coil spring surrounding the pressure screw between its inner and outer ends, a spring seat fixed to the rigid frame for the end of the spring remote from the guide member, said spring seat having an opening therein through which the pressure screw slidably extends, and a spring seat for the other end of the spring including a nut threaded on the pressure screw and slidable but non-rotatable relative to the rigid frame.

3. The pipe cutter of claim 1 in which the first spring seat has a part threaded into the housing to move the first spring seat toward and away from the second spring seat to vary the initial compression of the coil spring between the spring seats.

No references cited.